US005896264A

United States Patent [19]

Bijlenga et al.

[11] Patent Number: 5,896,264

[45] Date of Patent: Apr. 20, 1999

[54] DEVICE FOR CURRENT LIMITATION AND PROTECTION AGAINST SHORT-CIRCUIT CURRENTS IN AN ELECTRIC INSTALLATION

[75] Inventors: Maria Bijlenga, Skultuna; Lars Banghammar, Vasteras; Tomas Hansson, Enkoping; Ola Jeppsson, Vasteras, all of Sweden

[73] Assignee: ABB Research Ltd., Vasteras, Sweden

[21] Appl. No.: 08/894,049

[22] PCT Filed: Feb. 15, 1996

[86] PCT No.: PCT/SE96/00202

§ 371 Date: Oct. 16, 1997

§ 102(e) Date: Oct. 16, 1997

[87] PCT Pub. No.: WO96/25783

PCT Pub. Date: Aug. 22, 1996

[30] Foreign Application Priority Data

Feb. 16, 1995 [SE] Sweden .................................. 9500561

[51] Int. Cl.[6] .................................................... H02H 5/04

[52] U.S. Cl. ......................... 361/106; 361/58; 338/22 R

[58] Field of Search ............................ 361/93, 103, 100, 361/106, 58, 27; 338/22 R, 225 D, 260; 219/494, 497, 501, 510, 553

[56] References Cited

U.S. PATENT DOCUMENTS

| | | | |
|---|---|---|---|
| 2,720,573 | 10/1955 | Lundqvist | 338/22 R |
| 5,057,674 | 10/1991 | Smith-Johannsen | 219/553 |
| 5,166,658 | 11/1992 | Fang et al. | 338/23 |
| 5,382,938 | 1/1995 | Hansson et al. | 338/22 R |
| 5,602,520 | 2/1997 | Baiatu et al. | 338/22 R |

FOREIGN PATENT DOCUMENTS

| | | |
|---|---|---|
| 0 454 422 A3 | of 1991 | European Pat. Off. . |
| 469 250 | of 1993 | Sweden . |

*Primary Examiner*—Jeffrey Gaffin
*Assistant Examiner*—Michael J. Sherry
*Attorney, Agent, or Firm*—Pollock, Vande Sande & Amernick

[57] ABSTRACT

A current-limiting device comprises at least one polymer-based electrically conducting body with two contact surfaces and at least two electrodes. Close to a first one of the two contact surfaces of the polymer-based electrically conducting body, a surface layer is arranged. The resistivity of the surface layer is reduced relative to the resistivity of the bulk of the polymer body, and at the same time at least the second contact surface of the body is adapted to make free contact with at least one of the electrodes or other electrically conducting body.

10 Claims, 1 Drawing Sheet

DEVICE FOR CURRENT LIMITATION AND PROTECTION AGAINST SHORT-CIRCUIT CURRENTS IN AN ELECTRIC INSTALLATION

TECHNICAL FIELD

The present invention relates to a device for current limitation and protection against short-circuit currents, which comprises at least one polymer-based electrically conducting body and at least two electrodes, at least one of the contact surfaces of the electrically conducting body making contact freely with an electrode or another electrically conducting body.

BACKGROUND OF THE INVENTION

European patent EP 0 487 920 describes a device of the above-mentioned type in the form of a PTC element which at least comprises one polymer-based electrically conducting body, the resistivity of which exhibits a positive temperature coefficient and electrodes for conducting current through the body. At least one of the two contact surfaces of the polymer body makes free contact with one of the electrodes or another electrically conducting body. The polymer body and the electrodes are retained by resilient and pressure-applying devices. This results in to the creation of a contact pressure in a contact surface where the polymer body freely makes contact with an electrode or another electrically conducting body. Since current transition between the electrode and the polymer body only takes place at certain contact points, a current displacement arises at the contact surface resulting in a voltage drop near the contact surface. As a result of the difference in resistivity between the polymer body and the electrode, this voltage drop occurs substantially in the body which has the highest resistivity, that is, the polymer body.

At current intensities below rated current, a low contact resistance is maintained at the contact surface in that the contact pressure which is applied to the contact surface by the pressure-applying devices ensures current transition at a sufficient number of contact points. At short-circuit currents, the temperature at the contact points is increased. This increase in temperature results in a local melting and/or gasification of the polymer material at some of these points, whereby the resistance is increased. Finally, a layer of gasified polymer/carbon arises near a freely contacting contact surface, whereby a strong increase of the resistance across the layer is obtained, that is, the current-limiting device trips. Since the contact pressure is maintained by the pressure-applying devices, the original contact pressure and the original contact resistance are essentially resumed across the contact surface in connection with the gas pressure decrease. One problem is that the gasification has normally arisen at both contact surfaces of the polymer body before the current-limiting device trips. Therefore, it is difficult, using constructive changes such as cooling electrodes, etc., to increase the ability of the current-limiting device to withstand overcurrents for a limited period of time, i.e. currents with a current intensity is normally up to 10 times the rated current, while at the same time maintaining the ability of rapidly limiting short-circuit currents. Overcurrents of the order of magnitude of 10 times the nominal current occur frequently, for example when starting electric machines.

To maintain a low contact resistance at a normal current transition and to ensure that essentially the original contact and the original contact resistance are formed again after the current-limiting device has tripped as a result of a short-circuit current, it is desirable that a great contact pressure act on the contact surface since a high contact pressure ensures a large number of contact points and hence a large effective contact surface and a small current displacement. However, at the same time, the current-limiting function of the device is deteriorated since the limited current displacement results in a low energy development in the layer. In this way, with increasing contact pressure, a larger level of power must be supplied to the polymer body before the current-limiting device trips. This means that an increased contact pressure extends the time to a trip at short-circuit currents, which cannot be tolerated.

In European patent EP-A3-454 422, a PTC element is described which comprises a polymer-based electrically conducting body, the two contact surfaces of which consist of a polymer composition comprising an electrically conducting metal powder, preferably a nickel powder. By the addition of nickel powder, a PTC element with integrated electrodes is obtained. For a PTC element according to EP-A3-454 422 with a low contact resistance at both of its contact surfaces and hence a small current displacement at the contact surfaces, the whole of the polymerbased element will be heated homogeneously at increased current transition. This extends the time to trip at short-circuit currents in the same way as described above for a PTC element with a high contact pressure at the contact surfaces. Since the energy development in the PTC element becomes evenly distributed over the whole bulk of the PTC element, a large energy volume must be supplied to the PTC element before it trips. This means that the local melting and/or gasification of the polymer material, which arises at short-circuit currents and greatly increases the resistance and leads to the current-limiting device tripping, is not concentrated at a layer but arises at points, so-called hot spots, distributed over the whole bulk of the PTC element. In this way, there is no possibility, with a PTC element according to EP-A3-454 422, to predict where in the electrically conducting body the gasification occurs. The low contact resistance and the low power loss at a normal current transition for a PTC element according to EP-A3-454 422 are thus obtained at the cost of a long time to trip at short-circuit currents when a large energy volume must be supplied to the PTC element before it trips.

The object of the invention is to provide a device for current limitation, comprising an electrically conducting body which exhibits a low resistance at current intensities below rated current and an increased resistance to the overcurrents which normally occur in electric installations, that is currents with a current intensity which normally is up to 10 times the rated current, while at the same time the ability to rapidly and reliably limit short-circuit currents and other large fault currents is maintained or improved.

Further, it is an object of a current-limiting device according to the invention to be able to predict that tripping occurs at a layer near one of the two contact surfaces of the electrically conducting body and in which of these two contact surfaces tripping occurs. In this way, constructive measures can be suggested, by means of which the resistance across the electrically conducting body can be reduced, the resistance to brief and limited overcurrents increased, and the ability to rapidly and reliably limit short-circuit currents improved.

SUMMARY OF THE INVENTION

A device for current limitation and protection against short-circuit currents according to the invention comprises at least one polymer-based electrically conducting body with two contact surfaces and at least two electrodes. According to the invention, the polymer-based electrically conducting body comprises, adjacent a first one of the two contact surfaces of the body, a surface layer with an increased electrical conductivity, a reduced resistivity, while at the same time at least the second contact surface of the body is adapted to make contact freely with an electrode or another electrically conducting body. The first contact surface which comprises the layer with reduced resistivity may either be adapted to make contact freely with an electrode or be firmly secured, or fixed, to an electrode. Preferably, retaining and pressure-exerting means are adapted to retain the polymer-based electrically conducting body and the electrodes and to achieve a contact pressure, $P_k$, acting on a freely contacting contact surface.

Especially advantageous embodiments of the invention comprise a polymer-based electrically conducting body, arranged in the form of a plate or another flat body, with the electrodes applied to the two major surfaces of the flat body. By a flat body or a plate it is meant in this patent application a body whose thickness is essentially smaller than its length and width.

According to one embodiment of the invention, the surface layer arranged with reduced resistivity is based on a polymer such as a thermoplastic resin, an elastomer, or a thermosetting resin to which an electrically conducting powdered material has been added. Preferably, a polymer is chosen by means of which a good adhesion, primarily a chemical bond between the surface layer and the polymer body, is obtained. As powder addition, there is preferably chosen a metallic powdered material based on a metal with good electrical conductivity such as silver, gold, copper, nickel, or aluminium. Other conceivable powdered materials are ceramic powders based on, for example, borides such as titanium diboride, zirconium diboride, carbides such as tantalum carbide, silicon carbide, tungsten carbide, zirconium carbide, nitrides such as zirconium nitride, titanium nitride, oxides such as vanadium trioxide, titanium oxide, or mixtures of two or more of these powders. Decisive for the choice of powdered material are its conductivity and its ability, under the conditions prevailing in this coating layer when using and manufacturing the current-limiting device, to withstand oxidation or other reactions. The above-mentioned polymer-based surface layer, which has a reduced resistivity in relation to the bulk of the polymer-based body, is arranged according to one embodiment of the invention in the form of a polymer-based coating applied to the electrically conducting polymer body. The coating has a reduced resistivity relative to the electrically conducting polymer-based body and is preferably chemically bonded to the polymer-based electrically conducting body.

In another embodiment of the invention, the polymer-based electrically conducting body comprises a polymer-based surface layer, which has a reduced resistivity relative to the electrically conducting polymer-based body, and which is manufactured by jointly extruding the polymer-based body and the polymer-based surface layer. Like the polymer-based coating mentioned in the preceding paragraph, the jointly extruded polymer-based surface layer is preferably chemically bonded to the bulk of the polymer-based electrically conducting body.

According to an alternative embodiment, a surface layer of an electrically conducting material has been applied to one of the two contact surfaces of the polymer-based electrically conducting body. Preferably, a layer has been built up on this contact surface by precipitating the material of the surface layer on the surface of the polymer body from a gas. This is achieved by conventional methods in which a gas, comprising a substance which undergoes a chemical reaction on the contact surface whereby the layer material is precipitated and the layer builds up into the desired thickness, density and composition, so-called Chemical Vapor Deposition, CVD, or by a substance included in the gas condensing on the contact surface while the layer is built up into the desired thickness, density and composition, so-called Physical Vapor Deposition, PVD. Of special interest is the composition of the low-resistance surface layer by condensation of energy-rich particles from a gas where the energy-rich particles have been transferred to the gas by being excited and broken away by irradiation from a so-called target comprising the layer material, so-called sputtering. This applied surface layer preferably comprises one or more metals with a good electrical conductivity such as silver, gold, copper, nickel, or aluminium. As an alternative or as a complement to the metals, the layer may also comprise one or more electrically conducting ceramics in the form of borides such as titanium diboride, zirconium diboride, carbides such as tantalum carbide, silicon carbide, tungsten carbide, zirconium carbide, nitrides such as zirconium nitride, titanium nitride, oxides such as vanadium trioxide, titanium oxide, or mixtures or two or more of these metals or ceramics. Decisive for the choice of material is its electrical conductivity and its ability, under the conditions prevailing in this applied coating layer during use and manufacture of the current-limiting device, to withstand oxidation or other reactions.

Alternatively, the surface layer may comprise electrically conducting materials, such as ceramics and/or metals, which are applied to the contact surface and are built up by precipitation from a liquid or from a liquid solution or from a suspension of particles in a liquid. The liquid, or a substance dissolved in the liquid, or particles suspended in the liquid, contain(s) the electrically conducting material or a starting substance from which the electrically conducting material by a chemical or physical process is applied to the contact surface. The layer is then built up into the desired thickness, density and composition by precipitating the desired substance or substances on the contact surface by means of chemical and/or electrochemical methods such as absorption, adsorption, electrolysis, etc.

According to a preferred embodiment of the invention, the polymer-based electrically conducting body is in the form of a polymer-based thermistor with a positive temperature coefficient. The thermistor has, in a first of its two contact surfaces, with a surface layer according to any of the embodiments described above, which has an increased electrical conductivity relative to the thermistor, while at the same time at least the second contact surface of the thermistor makes contact freely with an electrode or another electrically conducting body. As described above, the layer comprises a material with a good electrical conductivity and may, as described above, be arranged as a surface layer jointly extruded with the thermistor, or as a surface coating applied to the thermistor.

By only arranging a first contact surface on a polymer-based electrically conducting body contacted, according to the present invention, whereas the second contact surface of the body is left non-contacted, while at the same time at least the non-contacted surface is arranged to make contact freely with an electrode or another electrically conducting body, both of the desired improvements are achieved at the same time. A PTC element according to the invention exhibits both an increased resistance to overcurrents, which are of the order of magnitude of up to 10 times the nominal current, and a faster, and much more reliable, current limitation at short-circuit currents. In addition, a device according to the invention provides a possibility of predicting that tripping occurs in a layer near the non-contacted contact surface of the body. In this way, constructive measures may be taken to further reduce the resistance across the electrically conducting body, increase the resistance to brief and limited overcurrents, and improve the ability to limit short-circuit currents in a fast and reliable manner

BRIEF DESCRIPTION OF THE DRAWINGS

The invention will be explained in greater detail in the following and be exemplified by means of a preferred embodiment with reference to the accompanying FIG. 1.

DETAILED DESCRIPTION OF THE PREFERRED EMBODIMENTS

Figure 1:
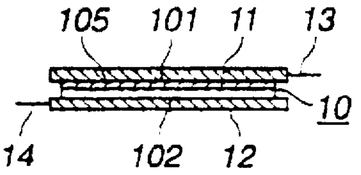
FIGS. 1 and 2 show a current-limiting device which comprises two electrodes and one and two electrically conducting bodies, respectively, with a surface layer according to the invention, arranged therebetween.

A current-limiting device according to FIG. 1 comprises a polymer-based electrically conducting body 10, illustrated in the figure in the form of a plate or disc, and two electrodes 11, 12 with associated terminals 13, 14 arranged near the body 10. The conducting body 10 is arranged with a surface layer 105 close to one of its two contact surfaces 101 which has a reduced resistivity relative to the bulk of the body. The second contact surface 102 of the body 10 makes contact freely with the electrode 12. The contact surface 101 which comprises the layer 105 with reduced resistivity may either make contact freely with the electrode 11 or be fixed to the electrode 11.

The polymer composition in the bulk of the electrically conducting body is of a known type and its composition or constituents constitute no part of the present invention. Thus, the invention is applicable to current-limiting devices which comprise electrically conducting polymer-based bodies in the form of known polymer compositions such as thermoplastic resins, elastomers, thermosetting resins, or mixtures of these such as, for example, the polymer-based bodies which are included in the PTC elements as described in European patent EP 0 487 920.

Nor is the geometrical embodiment of the contact surfaces of the body of significance for the invention, but the invention is applicable as long as at least one of the two contact surfaces 101 of the body 10 may be arranged with reduced resistivity while at the same time an electrode may be arranged to make contact freely with the other of the two contact surfaces 102 of the body 10, that is, that contact surface which is not arranged having a layer 105 with a reduced resistivity. The contact surfaces 101, 102 of the body 10 may be plane, curved in one or two dimensions or designed in some other way. Likewise, the invention is applicable whether the polymeric body 10 and/or the layer with reduced resistivity 105 is/are based on a hard polymer or a more elastically workable polymer such as an elastomer.

In one embodiment of the invention, the electrically conducting body consists of a plate 10 based on a polyolefin such as polyethylene, crosslinked polyethylene, polypropylene, polybutene, copolymers of ethylene and propylene, etc. with addition of one or more electrically conducting powdered coal-based materials such as carbon black. The particle size of the electrically conducting powdered material is usually 0.01–100 μm and the powder has been added to the polymer composition in a percentage by volume of 10–60 per cent. In embodiments where more than one electrically conducting body are included in the current-limiting device, these may be of the same or of different polymer compositions and thus with the same or a different resistivity. In a low-resistance state, the polymer material has a resistivity of 1 mΩcm–10 Ωcm whereas the two electrodes 11, 12 are suitably arranged in the form of silverplated copper plates.

Figure 4:
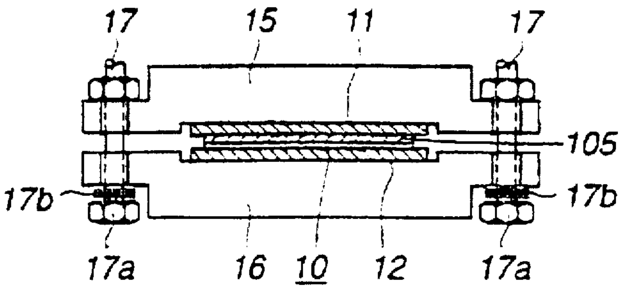
FIG. 4 shows a current-limiting device comprising two electrodes and an electrically conducting body arranged between the electrodes, and means for retaining the body and the electrodes and for achieving a contact surface, $P_k$, acting on a freely contacting contact surface.

The resistance across an electrically conducting polymer plate, $R_{tot}$, is composed of a resistance in the bulk of the plate 10, $R_{bulk}$, and contact resistances adjacent the contact surfaces 101, 102, $R_{y1}$ and $R_{y2}$, that is, $R_{tot}=R_{y1}+R_{bulk}+R_{y2}$. The contact resistance in a contact surface 101, 102 where an electrically conducting body 10 makes contact freely with an electrode 11, 12 is dependent on the current transition at the contact surface only occurring at certain contact points. This reduces the effective contact surface and gives rise to a current displacement at the contact surface 101, 102. The contact resistance at such a contact surface is influenced by the pressure which the retaining 15, 16 and pressure-exerting means 17, 17*a*, 17*b* shown in FIG. 4 achieve at the contact surface 101, 102. At the same time, as the contact resistance at the contact surface is reduced as a result of the number of contact points increasing with an increasing contact pressure, however, the current-limiting function of the device is deteriorated since more energy must be added before the electrically conducting polymer body has become heated to a temperature when the current-limiting device trips. According to the present invention, the electrically conducting polymer 10 adjacent a first contact surface 101 is instead arranged with a layer 105 with an increased electrical conductivity, a reduced resistivity, while at the same time at least the second contact surface 102 of the electrically conducting polymer body makes contact freely with an electrode 12.

Figure 2:
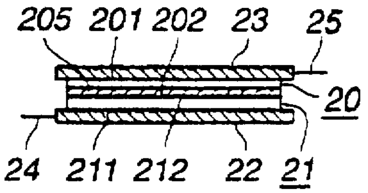

The current-limiting device in FIG. 2 comprises a polymer-based electrically conducting body 20 with a surface layer 205 with reduced resistivity according to the invention and an additional electrically conducting body 21. The body 20 is arranged between an electrode 23, with an associated connection 25, with which it freely makes contact at the contact surface, and the second body 21. According to the invention, the first body 20 is arranged with a surface layer 205 with reduced resistivity arranged close to the contact surface 202 which adjoins the second electrically conducting body 21. The two bodies 20, 21 may make contact freely with each other at the contact surface 202/212 or be fixed to each other, for example by fusion. A second electrode 22, with an associated connection 24, is arranged close to the second body 21. This second electrode 22 may be adapted to make contact freely with the contact surface 211 of the body 21 or be fixed to this contact surface 211. The second electrically conducting body 21 may be of the same electrically conducting polymer composition or a different polymer composition with a different resistivity and/or adapted to limit the current at a different energy supply. Likewise, the second electrically conducting body 21 may be of a deviating function. The device according to the principle of FIG. 2 may be further modified by arranging a plurality of electrically conducting bodies 20, 21 of the same or a different type in series between the two electrodes 22, 23.

Figure 3:
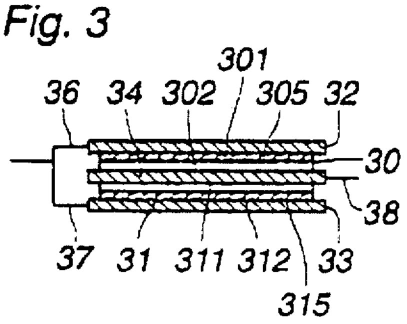
FIG. 3 shows an embodiment where electrodes are arranged between the two parallel-connected electric bodies.

The current-limiting device in FIG. 3 comprises a third intermediate electrode 34 with an associated connection 38 arranged between two polymer-based electrically conducting bodies 30, 31 and two external electrodes 32, 33 with associated terminals 36, 37. The bodies 30, 31 make contact freely, at least at their internal contact surfaces 302, 311, with the intermediate electrode 34, while at the same time, the two bodies 30, 31 each comprising a surface layer 305, 315 with reduced resistivity which are arranged close to those contact surfaces 301 and 312, respectively, which are arranged close to the external electrodes 32 and 33, respectively. Of course, the bodies 30, 31 may also be arranged with the surface layers 305, 315, arranged with reduced resistivity, close to the intermediate electrode 34 if the external electrodes 32, 33 are adapted to make contact freely with the contact surfaces 301, 312, or one polymer body 30 may be arranged with its low-resistance surface layer 305 against an external electrode 32 while at the same time its second contact surface 302 makes contact freely with the intermediate electrode 34 whereas the second body 31 is arranged in the opposite manner, i.e. with the low-resistance layer 315 against the intermediate electrode 34 and the second contact surface 312 making contact freely with an external electrode 33. Those contact surfaces on the bodies 30, 31, which are arranged with a surface layer 305, 315 with reduced resistivity, may be adapted to freely make contact with that electrode which is arranged close to the mentioned surface or be fixed to the mentioned electrode without influencing the invention as long as the second contact surface of the respective body 30, 31 makes contact freely with its electrode.

Figure 5:
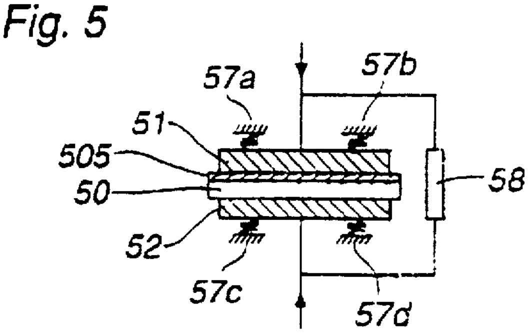
FIG. 5 shows an electric circuit comprising a current-limiting device according to the invention.

FIG. 5 shows an electric circuit in which a current-limiting device according to the invention is parallel-connected to another electrically conducting body 58, shown in FIG. 5 in the form of a resistor. The parallel-connected body 58 may be a linear or non-linear resistor, a PTC element or an electrically conducting body which exhibits a resistivity with a negative temperature coefficient, an NTC element, a varistor or another electrically conducting functional body, such as a coil. The body 58 preferably has a resistance which, at currents below the rated current, is between 5 and 1000 higher than the resistance across the electrically conducting body 50 between the electrodes 51, 52. In the current-limiting device, the electrically conducting body 50 and the electrodes 51, 52 are retained by retaining and pressure-applying means 57*a*, 57*b*, 57*c*, 57*d*. As previously described, the current-limiting body is arranged with a layer 505 with reduced resistivity close to one of the electrodes 51. The electrode 51 may make contact freely with the body 50 or be fixed. On the other hand, the other electrode 52 must be adapted to make contact freely with the body 50.

Since current can pass through the parallel-connected body 58 at short-circuit currents, the energy development in the current-limiting device is reduced during a trip. In certain contexts it may be advantageous to arrange a number of bodies 50 according to the invention in parallel to obtain a form of cascade effect regarding the current limitation. That is to say, in a number of parallel-connected current paths, a body according to the invention is arranged in each current path. The bodies are connected together in such a way that the cold resistance increases in steps amounting to between 5 and 1000 times when changing to the next current path.

Figure 6:
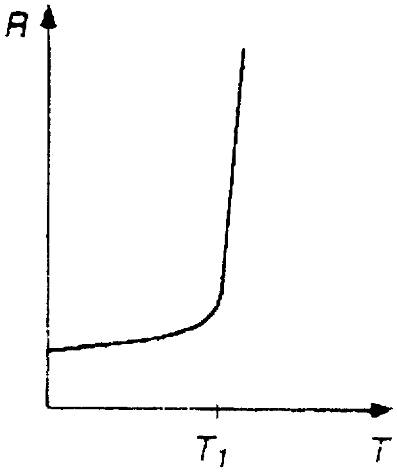
FIG. 6 shows the resistivity of a PTC element as a function of the temperature.

FIG. 6 shows the resistivity ρ as a function of the temperature T of an electrically conducting polymer composition included in a polymer-based PTC element. At temperature $T_r$, the transition temperature or the trip temperature, the polymer composition changes from a low-resistance state with a resistivity in the interval 1 mΩcm–10Ωcm into a high-resistance state with a resistivity 10 to 1000000 ($1\times10^6$) times higher than the cold resistance.

We claim:

1. A current-limiting device comprising at least one polymer-based electrically conducting body with two contact surfaces and at least two electrodes wherein said at least one polymer-based electrically conducting body close to a first one of its two contact surfaces has a surface layer which, in relation to the bulk of said polymer-based electrically conducting body, has a reduced resistivity while at the same time an electrode of said two electrodes or another electrically conducting body makes contact freely with at least the second contact surface of said body.

2. A current-limiting device according to claim 1, further comprising retaining means and pressure-exerting means adapted to retain at least said electrically conducting polymer-based body and said two electrodes and to achieve a contact pressure acting on said second freely contacting contact surface.

3. A device according to claim 1, wherein said surface layer arranged at the first contact surface of the polymer-based electrically conducting body is chemically bonded to said polymer-based electrically conducting body.

4. A device according to claim 1, wherein said surface layer is arranged at the first contact surface of the polymer-based electrically conducting body comprises an electrically conducting powder such as a metallic powder based on any of the following metals: silver, gold, copper, nickel, or aluminum.

5. A device according to claim 1, wherein said surface layer arranged at the first contact surface of the polymer-based body is in the form of a polymer-based coating applied to the polymer-based electrically conducting body.

6. A device according to one claim 1, wherein said surface layer is arranged in the form of a polymer-based layer which is jointly extruded with the polymer-based electrically conducting body.

7. A device according to claim 1, wherein the electrode which is arranged close to said first contact surface having said surface layer with reduced resistivity is fixedly connected to the polymer-based electrically conducting body.

8. A device according to claim 1, wherein said polymer-based electrically conducting body is in the form of a thermistor which exhibits a resistivity with a positive temperature coefficient.

9. A device according to claim 1, wherein said surface layer arranged at the first contact surface of the polymer-based electrically conducting body comprises an electrically conducting material that has been precipitated from a gas, a liquid or a suspension comprising said material and has been built up into the desired thickness, composition and density by a chemical and/or physical process.

10. A device according to claim 1, wherein said surface layer arranged at the first contact surface of the polymer-based body comprises an electrically conducting material that has been precipitated from condensation of energy-rich particles, contained in a gas, which have been supplied to the gas by irradiation of a material comprising material included in the surface layer.

* * * * *